H. F. MOULDEN.
SAD IRON HOLDER.
APPLICATION FILED APR. 7, 1908.

935,123.

Patented Sept. 28, 1909.
2 SHEETS—SHEET 1.

Witnesses.
H. L. Trimble.
N. R. Robertson.

Inventor.
Harry F. Moulden
by Charles H Riches
his Attorney

H. F. MOULDEN.
SAD IRON HOLDER.
APPLICATION FILED APR. 7, 1908.

935,123.

Patented Sept. 28, 1909.
2 SHEETS—SHEET 2.

Witnesses.

Inventor.
Harry F. Moulden
by Charles H. Riches
his Attorney

UNITED STATES PATENT OFFICE.

HARRY FREDRICK MOULDEN, OF GUELPH, ONTARIO, CANADA.

SAD-IRON HOLDER.

935,123.	Specification of Letters Patent.	Patented Sept. 28, 1909.

Application filed April 7, 1908. Serial No. 425,693.

*To all whom it may concern:*

Be it known that I, HARRY FREDRICK MOULDEN, of the city of Guelph, in the county of Wellington and Province of Ontario, Canada, have invented certain new and useful Improvements in Sad-Iron Holders; and I hereby declare that the following is a full, clear, and exact description of the same.

This invention relates to a sad-iron holder so constructed that the sad-iron can be tilted into, and held in, an upright position entirely clear of contact with the surface upon which the sad-iron holder is resting, and the invention may be described as consisting of a sad-iron holder comprising a semi-circular shaped handle bar the ends of which are connected together by a stretcher bar provided with a supporting member which is adapted to engage the surface upon which the sad-iron holder is resting, when the sad-iron is tilted into an upright position, to prevent the lateral or upsetting movement of the sad-iron holder and sad-iron when so positioned as hereinafter described and particularly pointed out in the claim.

For an understanding of the invention reference is to be had to the following description and to the accompanying drawings in which:—

Figure 1:
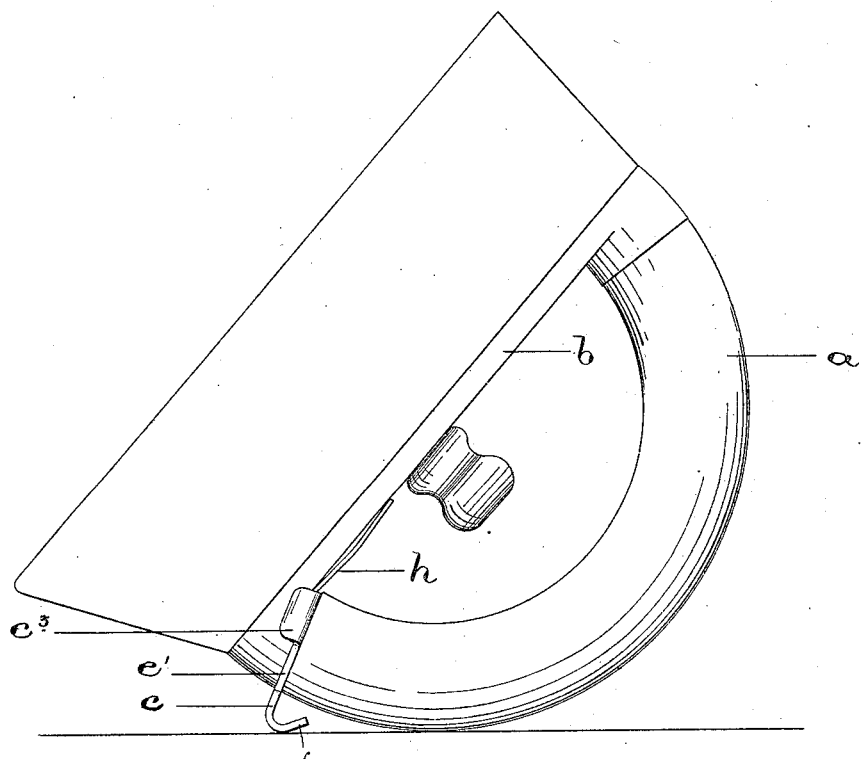
Figure 2:
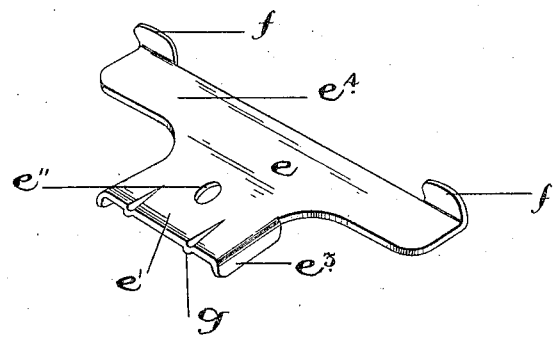
Figure 2:
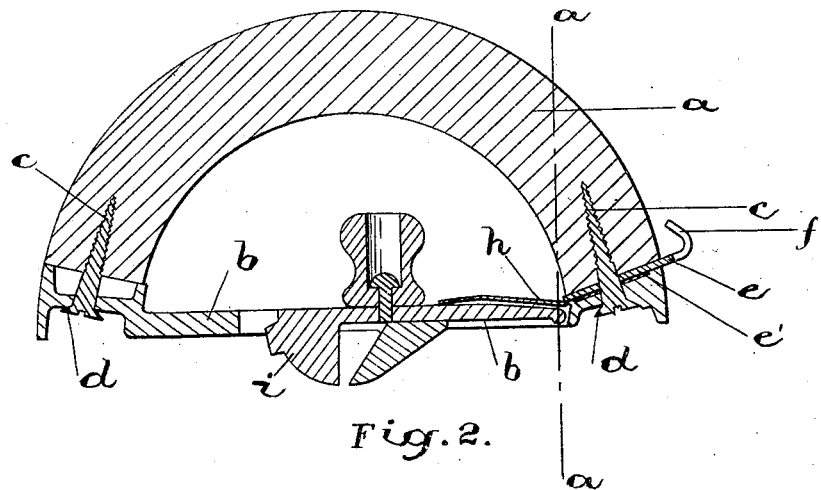
Figure 3:
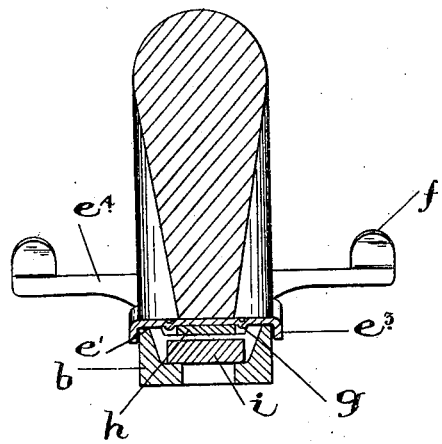
Figure 5:
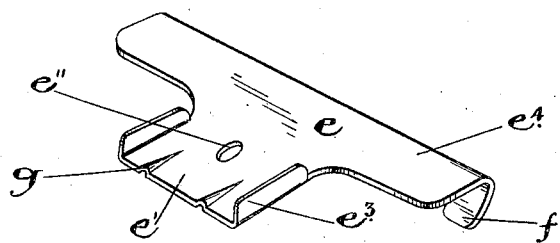

Figure 1, is a side elevation of the sad-iron holder and sad-iron showing them in their tilted position. Fig. 2, is a longitudinal section of the sad-iron holder. Fig. 3, is a transverse section on the line $a$—$a$ Fig. 2. Fig. 4, is a perspective view of the supporting member looking at it from the topside. Fig. 5, is a similar view to Fig. 4, looking at it from the under side.

Like characters of reference refer to like parts throughout the specification and drawings.

The sad-iron holder may be described as comprising a semi-circular handle bar $a$ the ends of which are connected together by a stretcher bar $b$ secured to the ends of the handle bar by screws $c$ passing through screw apertures $d$ in the ends of the stretcher bar and entering the ends of the handle bar.

Interposed between the stretcher bar and one end of the handle bar is a supporting member $e$ which may be described as consisting of a body part $e'$ extending lengthwise of the stretcher bar and formed with a screw aperture $e''$, which registers with the screw aperture $d$ in the adjacent end of the stretcher bar, to receive the fastening screw $c$, which passes through and fastens the spring $h$, the supporting member, and the adjacent end of the stretcher bar to the handle bar. Extending downwardly from the side edges of the body part $e'$ are flanges $e^3$ to engage with the side edges of the stretcher bar and prevent the lateral movement of the supporting member. At the end of the body part $e'$ is a transversely disposed part $e^4$ of substantially the same width as the sad-iron at its widest part, and extending upwardly from the outer edge of the transverse part and at or near the ends thereof are supporting lugs $f$. The transverse part $e^4$ extends evenly beyond each side of the stretcher bar and the lugs $f$ are positioned evenly beyond each side of the handle bar. Extending downwardly from the under surface of the body part $e'$ are ribs $g$ which engage the side edges of the spring $h$ and prevent the lateral movement of the spring on the stretcher bar and catch $i$. The construction of the handle bar, stretcher bar and catch $i$ are similar to those now used, and the sad-iron is used in the same manner as those in use. When the sad-iron is tilted into an upright position, the handle bar $a$ and lugs $f$ rest upon the supporting surface and raise the sad-iron above the supporting surface, the lugs $f$ preventing the side movement of the sad iron and holder.

The supporting member can be easily attached to any sad iron holder now used and in the event of injury to the supporting member the latter can be removed and replaced by another.

Having thus fully described my invention what I claim as new and desire to secure by Letters Patent is:—

A supporting member for a sad iron comprising a flat body part extending lengthwise, of a handle bar, and having angularly disposed flanges, to engage the stretcher bar, and a transverse part in the same plane as the body part extending beyond the sides thereof and having angularly disposed lugs to engage a supporting surface and hold the supporting member and associated parts in an upright position, and spring engaging ribs on the body part.

Toronto March 6th, 1908.

HARRY FREDRICK MOULDEN.

Signed in the presence of—
N. R. ROBERTSON,
H. L. TRIMBLE.